Dec. 19, 1922.
S. SUEKOFF.
VOLTAGE REGULATING CIRCUIT.
FILED JULY 10, 1920.
1,439,036.
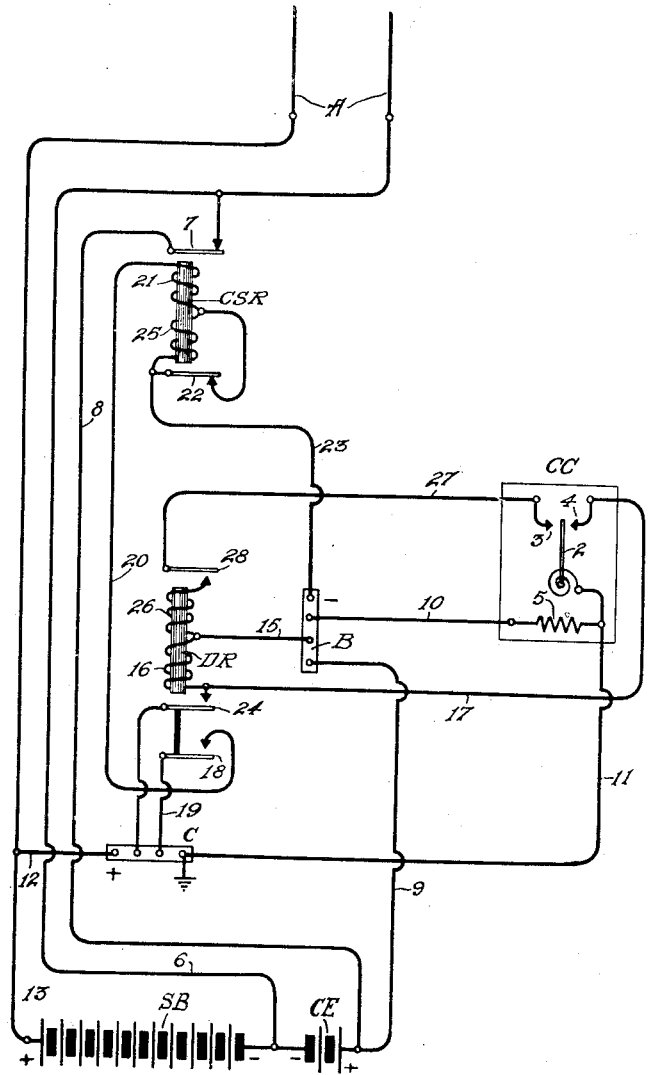
Inventor:
Samuel Suekoff.
By Curtis B. Camp.
Attorney.

Patented Dec. 19, 1922.

1,439,036

UNITED STATES PATENT OFFICE.

SAMUEL SUEKOFF, OF CHICAGO, ILLINOIS, ASSIGNOR TO KELLOGG SWITCHBOARD AND SUPPLY COMPANY, OF CHICAGO, ILLINOIS, A CORPORATION OF ILLINOIS.

VOLTAGE-REGULATING CIRCUIT.

Application filed July 10, 1920. Serial No. 395,330.

*To all whom it may concern:*

Be it known that I, SAMUEL SUEKOFF, residing in Chicago, county of Cook, and State of Illinois, have invented certain new and useful Improvements in Voltage-Regulating Circuits, of which the following is a specification.

My invention relates to voltage regulators and has to do more particularly with voltage regulators that are used in connection with storage batteries for automatically maintaining the voltage of the battery within certain limits, and an object of my invention is to provide a voltage regulator of the above type which is simple in construction and positive and efficient in its operation.

In telephone systems of the common battery type in which a storage battery is used for transmission and operating purposes, the best results are obtained by maintaining the battery potential within certain specified limits, and it is to systems of the above type toward which the present invention is particularly directed.

A feature of my invention is the provision of means in the form of a sensitive circuit closer which operates in association with a pair of relays to automatically regulate the battery potential across the bus bars of the power board.

Further features of the invention not specifically referred to above will appear in the detailed description and appended claims, and the other advantageous results which are attained will be explained by reference to the accompanying drawing, in which a preferred embodiment of the invention is shown.

Referring now more in general to my invention as illustrated in the accompanying drawing, I show at "A" a pair of conductors leading to a charging source of current for charging the storage batteries SB. I also provide an automatic circuit closer CC of any approved and well known type. When the voltage at the bus bars of the power board reaches a predetermined maximum limit, the circuit closer operates to automatically reduce the potential at the said bus bars, and when the voltage drops to a minimum predetermined limit, the circuit closer operates to automatically raise the voltage at the power board bus bars. At B and C I show the bus bars of the switchboard, which bus bars B and C receive, respectively, the negative and positive battery common, as well as other connections, as is well understood. I also provide a pair of counter cells CE which are used as a counter E. M. F. and introduced in circuit with the storage battery when the voltage reaches its maximum limit to reduce the voltage at the bus bars. I also provide a counter cell shunting relay CSR and a differential relay DR for purposes as will be more fully hereinafter described.

Having described in general the voltage regulating circuit of my invention, I will now describe in detail its operation.

Referring now to the drawing, I illustrate the apparatus at normal, in which position it is when the voltage of the storage battery SB is within the predetermined limits. Assuming now that the storage battery has been charged, as soon as the voltage reaches the maximum predetermined limit, the sensitive automatic circuit closer CC operates. The pointer 2 of the circuit closer CC is operatively associated with a pair of contacts 3 and 4, and a winding 5 is provided which is bridged across the bus bars and through which current flows. As long as the voltage stays within its maximum and minimum limits, the pointer 2 of the circuit closer CC remains in an intermediate position. The circuit for coil 5 extends from the negative pole of the storage battery SB, over conductor 6, normal contact 7 of the counter cell shunting relay CSR, conductors 8 and 9, to the bus bar B, and then over conductor 10, through winding 5 of the circuit closer CC, over conductor 11 to bus bar C, and over conductors 12 and 13 to the positive side of the storage battery SB. The counter E. M. F. cells are normally shunted out by conductors 6 and 8 and normally closed contact 7 of the relay CSR.

Now when the voltage exceeds its maximum limit margin, the current from the battery SB will traverse the path just described and, due to the adjustment of the circuit closer CC, the pointer 2 will move to the right into engagement with the contact 4, closing an energizing circuit for the differential relay DR, over a circuit traced from the negative pole of the battery SB, conductor 6, normal contact 7 of relay CSR, conductors 8 and 9, the bus bar B, conductor 15, lower winding 16 of the differential relay DR, conductor 17, contact 4, pointer 2, conductor 11, bus bar C, and conductors 12 and 13 to the positive pole of the battery SB. The closing of alternate contact 18 of relay DR, when it energizes, establishes an energizing circuit for the relay CSR, traced from the positive pole of the battery SB at bus bar C, over conductor 19, alternate contact 18 of relay DR, conductor 20, through winding 21 of relay CSR, normal contact 22 of relay CSR, and conductor 23 to the negative bus bar B and to battery. The closing of alternate contact 24 of relay DR establishes a locking circuit for itself, traced from the battery at the positive bus bar C through its alternate contact 24, winding 16 of relay DR, conductor 15 to the negative pole of battery at bus bar B. The relay CSR is provided with two windings for the reason that its armatures are arranged in such a manner that a large flow of battery is required in the first instance to energize the said relay sufficiently to move the said armatures to their alternate position, but when once in their alternate position they will remain so on less current passing through the windings of relay CSR. The normal contact 22 permits the winding 25 to be shunted out to permit sufficient flow of battery to energize relay CSR in the first instance, but when contact 22 is opened, the winding 25 is placed in series with winding 21, thus only permitting sufficient battery to flow to retain relay CSR energized. Upon the energization of relay DR alternate contact 28 is closed to close a circuit through its upper winding 26, but this circuit being open at contact 3 of the circuit closer CC no battery can flow over this circuit, but when the pointer 2 moves to the left, contact 3 is closed, thus completing the circuit through the winding 26 and bringing about the de-energization of the differential relay DR, due to battery now flowing through both of its windings. The relay DR is now held energized over the locking circuit just described independent of the contact 4 of the circuit closer CC, and the opening of normal contact 22 of relay CSR permits the same to be held energized over a circuit extending from the positive pole of battery at bus bar C, conductor 19, alternate contact 18 of relay DR, conductor 20, windings 21 and 25 of relay CSR, and conductor 23 to the negative pole of battery at the bus bar B. The opening of normal contact 7 of relay CSR removes the shunt from about the two counter E. M. F. cells CE, and the cells CE now are connected in circuit with the storage battery SB to oppose the storage battery SB, thereby reducing the potential across the bus bars at the power board. This allows the pointer of the circuit closer CC to restore to an intermediate position between the contacts 3 and 4.

Now when the storage battery decreases in voltage due to usage, and when the voltage reaches its minimum predetermined limit, the pointer 2 of the device CC engages with contact 3, which closes a circuit through the upper winding 26 of the relay DR, the circuit being traced from the positive pole of battery at bus bar C, over conductor 11, pointer 2, contact 3, conductor 27, alternate contact 28 of relay DR, through the winding 26 of relay DR, and over conductor 15 to the negative pole of battery at bus bar B. The relay DR being differential in construction restores, and the opening of its alternate contact 18 opens the energizing circuit of the counter cell shunting relay CSR, and the relay CSR restoring again closes its normal contact 7, which contact again shunts the counter E. M. F. cells CE, which now removes the said cells CE from the battery circuit, allowing the said storage battery its true voltage. Increasing the potential at the bus bars of the power board permits the pointer 2 to again assume intermediate position.

From the foregoing it may be seen that with the voltage regulating circuit of my invention I can always keep the voltage of a storage battery between a maximum and minimum limit, and the regulation is entirely automatic, thus when a common battery exchange is equipped with the regulating circuit, a most efficient operation of the system is obtained.

My invention is particularly adaptable for small boards or private branch exchanges where an attendant is not maintained to preserve the battery potential within the set limits. Of course, my invention is also suited for large exchanges.

While I have described the voltage regulating circuit of my invention in connection with a specific circuit arrangement, I also do not wish to be limited to the exact circuit as illustrated and described, as changes and modifications will readily suggest themselves to those skilled in the art, and I, therefore, aim to cover all such changes and modifications as come within the spirit and scope of the appended claims.

What I claim as new and desire to secure by United States Letters Patent, is:

1. A voltage regulator comprising a sensitive circuit closer, a pair of relays comprising a double-wound relay and a shunting relay operatively associated therewith, said double-wound relay controlling the circuit of said shunting relay, a pair of bus bars, a storage battery connected across said bus bars, and means controlled by said relays in association with the said circuit closer for maintaining the potential across the said bus bars within certain limits.

2. A voltage regulator comprising a sensitive circuit closer, a pair of relays operatively associated therewith, one of said relays being a double-wound relay which controls the circuit of the other relay of said pair, a storage battery and a charging source of current therefor, actuating means for said circuit closer operating to control the operation of said relays when the voltage of said storage battery has been raised by said charging source to its maximum margin, and means operatively associated with said storage battery upon the operation of said relays for reducing the effective voltage of said storage battery.

3. A voltage regulator comprising a sensitive circuit closer, a pair of relays operatively associated therewith, a storage battery and counter E. M. F. cells in association therewith, said E. M. F. cells normally shunted out of circuit with said storage battery by a circuit extending through a contact of one of said pair of relays, a source of charging current, actuating means for said circuit closer operated in one direction when the voltage of said storage battery reaches its maximum limit while being charged from said charging source, and an energizing circuit closed through one of said relays upon the operation of said circuit closer to remove the shunt and to connect said counter E. M. F. cells in circuit with said battery to reduce the effective voltage of said storage battery to within a predetermined limit.

4. A voltage regulator comprising a sensitive circuit closer, a pair of relays operatively associated therewith, one of said pair of relays being a differential relay which controls the operation of the other of said relays, intermediate and two operative positions for said circuit closer, a storage battery adapted to be maintained within a predetermined maximum and minimum voltage limit, and operating means for said circuit closer adapted to move the same to one of its operative positions when the voltage of said storage battery exceeds its maximum margin, thereby operating said relays to introduce means to reduce the effective voltage of said storage battery to within its predetermined limit.

5. A voltage regulator comprising a circuit closer having intermediate and two operative positions, a counter cell shunting relay and a differential relay, operatively associated with said circuit closer, said differential relay controlling the operation of said counter cell shunting relay, a storage battery adapted to be maintained below a predetermined maximum voltage limit, operating means for said circuit closer adapted to be moved to one of its operative positions when the voltage of said storage battery exceeds its maximum limit, thereby operating said relays to introduce means in associated with said storage battery to reduce the effective voltage of said storage battery to within its predetermined limit, and a locking circuit for said relays independent of said circuit closer.

6. A voltage regulator comprising a circuit closer having intermediate and two operative positions, a differential relay and a relay controlled thereby, both operatively associated with said circuit closer, a storage battery adapted to have its potential maintained within a predetermined maximum and minimum limit, means controlled through the movement of said circuit closer to one of its operative positions and the operation of said relays and adapted to be placed in circuit with said storage battery when the voltage of said storage battery exceeds its maximum limit, a locking circuit for said relays, and the movement of said circuit closer to its other operative position when the voltage of said storage battery drops below its minimum voltage limit to cause the restoration of said relays, thereby shunting said means to raise the effective voltage of said storage battery.

7. A voltage regulator comprising a sensitive circuit closer having an intermediate and an operative position, a pair of relays comprising a counter cell shunting relay and a differential relay operatively associated with said circuit closer, a storage battery and a charging source therefor, counter E. M. F. cells associated with said storage battery, and operating means for said circuit closer actuated when the potential of said storage battery reaches a predetermined limit to cut in circuit said counter E. M. F. cells through the operation of said relays to reduce the effective voltage of said storage battery.

Signed by me at Chicago, in the county of Cook and State of Illinois, this 8th day of July, 1920.

SAMUEL SUEKOFF.